US009588869B2

(12) United States Patent
Kumar et al.

(10) Patent No.: US 9,588,869 B2
(45) Date of Patent: Mar. 7, 2017

(54) COMPUTER IMPLEMENTED SYSTEM AND METHOD OF INSTRUMENTATION FOR SOFTWARE APPLICATIONS (71) Applicant: Tata Consultancy Services Ltd., Mumbai, Maharashtra (IN)

(72) Inventors: Anand Kumar, Pune (IN); Vinay Kulkarni, Pune (IN)

(73) Assignee: TATA CONSULTANCY SERVICES LTD., Mumbai (IN)

( * ) Notice: Subject to any disclaimer, the term of this patent is extended or adjusted under 35 U.S.C. 154(b) by 24 days.

(21) Appl. No.: 14/631,276

(22) Filed: Feb. 25, 2015

(65) Prior Publication Data
US 2015/0301921 A1    Oct. 22, 2015

(30) Foreign Application Priority Data

Feb. 25, 2014   (IN) .......................... 662/MUM/2014

(51) Int. Cl.
*G06F 11/36*   (2006.01)
*G06F 9/54*    (2006.01)
(Continued)

(52) U.S. Cl.
CPC .......... *G06F 11/3612* (2013.01); *G06F 9/542* (2013.01); *G06F 11/3072* (2013.01); *G06F 11/327* (2013.01); *G06F 11/3476* (2013.01); *G06F 11/3006* (2013.01); *G06F 11/3089* (2013.01); *G06F 2201/86* (2013.01)

(58) Field of Classification Search
CPC ............. G06F 11/3072; G06F 11/0748; G06F 11/327; G06F 9/542
See application file for complete search history.

(56) References Cited

U.S. PATENT DOCUMENTS 7,483,810 B2   1/2009 Jackson
7,818,754 B2  10/2010 Morris
(Continued)

OTHER PUBLICATIONS

Anand et al., "High performing Scalable Architecture for Instrumenting Software Applications", Tata Consultancy Services, Tata Research Development and Design Centre, 2nd CMG Event—Pune, Dec. 2013, presentation, 34 pp.
(Continued)

Primary Examiner — Yolanda L Wilson
(74) Attorney, Agent, or Firm — Robert Plotkin, P.C.; Robert Plotkin (57) ABSTRACT A method(s) and system(s) of monitoring and logging of various identified events of the operating system or the software application hosted on the operating system is disclosed. The method includes configuring the events associated with at least one event handler for monitoring. The method further includes assigning the at least one event handler to active processes of an operating system for handling of the events. Further, the method includes capturing of events by a different daemons and collecting the captured events. To this end, the captured similar events are grouped in one or more groups. The method further includes filtering of collected events based on a definable filter configuration and generating a dashboard representation of the filtered events. The dashboard representations of filtered events are then reported to the user.

17 Claims, 4 Drawing Sheets (51) Int. Cl.
    *G06F 11/32*     (2006.01)
    *G06F 11/34*     (2006.01)
    *G06F 11/30*     (2006.01)

(56) References Cited

U.S. PATENT DOCUMENTS

| | | | |
|---|---|---|---|
| 7,945,434 B2 | 5/2011 | Lovas | |
| 2005/0010929 A1* | 1/2005 | Wang | G06F 11/3476 719/318 |
| 2005/0132121 A1 | 6/2005 | Robinson | |
| 2006/0085798 A1 | 4/2006 | Bendiksen | |
| 2006/0112061 A1* | 5/2006 | Masurkar | G06F 11/0709 706/47 |
| 2007/0174716 A1* | 7/2007 | Erdtmann | G06F 11/0709 714/39 |
| 2008/0114873 A1* | 5/2008 | Chakravarty | G06F 11/3065 709/224 |
| 2009/0222552 A1 | 9/2009 | Chroscielewski | |
| 2010/0030888 A1* | 2/2010 | Nawabzada | G06F 11/0709 709/224 |
| 2012/0144021 A1* | 6/2012 | Carey | G06F 11/3006 709/224 |
| 2013/0060601 A1* | 3/2013 | Kodialam | G06Q 30/02 705/7.29 |
| 2013/0086587 A1* | 4/2013 | Naik | G06F 11/0781 718/100 |
| 2014/0189104 A1 | 7/2014 | Dalton | |

OTHER PUBLICATIONS

Maalei et al., "Chapter 1 Collecting and Processing Interaction Data for Recommendation Systems", Recommendation Systems in Software Engineering, Springer, Robiliard, M.P., Maalej, W., Walker, R.J., Zimmermann. Th. (Eds.) Dec. 20, 2013, pp. 1-25, Available at: http://www.springer.com/computer/swe/book/978-3-642-45134-3.

* cited by examiner

COMPUTER IMPLEMENTED SYSTEM AND METHOD OF INSTRUMENTATION FOR SOFTWARE APPLICATIONS

TECHNICAL FIELD

The present disclosure relates, in general, to computer systems, and in particular, to a system and method of global context based instrumentation for software applications.

BACKGROUND

As technology has progressed, the processing capability of computer systems has increased dramatically. Today's computer systems offer a set of features that enables rich user experiences for every application that is hosted on them. Thus the progress has led to a dramatic increase in the types of software applications which can be hosted and executed on the computer systems. This also led to increase in the functionality of these hosted software applications. Additionally, technological advancements have led the way for multiple computer systems, each executing multiple software applications, to be easily connected together via a network. Accordingly, software applications have become larger and more complicated in design. This increased complexity and scale in software application design present difficult challenges in assessing software.

To measure and improve the quality of conventional software applications, use of software instrumentation is an effective solution. Further, it is possible to determine the cause for a software application failure by examining the data gathered by various instruments. By analysing the gathered data over a time-scale, it is possible to identify recurring problems in software applications before they can cause massive damage. Furthermore, it is also possible to identify and solve associated software quality issues based on the analysed data. Such causal analysis of the context in which the failure happens can then lead to an improvement in overall software quality.

Conventionally, monitoring events in computing environment has been difficult to achieve. Conventional operating systems provide Management and Instrumentation frameworks and performance counters to monitor application resource usage and execution status. Usually the operating system's event management framework facilitates recording the application errors and proprietary events in a standard, centralized way in the form of an event log which can then be examined using the resident event viewer or by using a programming interface. To this end, the event logging is helpful for recording important events, such as low resource availability, authentication failure, etc., examining which can determine the conditions that cause the error/event to occur.

Further, if the event logging is built into an application then many of the application specific events can be captured in the event log and its trace can provide the sequence of operations that are performed in a software application. However, operating system specific events, GUI events, network events that are triggered when this application is used are not captured, which means the operating system events are not subscribed by the software application. This is a cause for concern as all software applications run on top of an operating system and it becomes difficult to pin-point the exact reason for a software failure.

Therefore, for the collected event data to be meaningful, it is necessary to capture events pertaining to an operating system as well as all applications, processes and services that run on top of the operating system. This necessitates the need for global context based instrumentation with regard to event capturing, filtering and recording.

Hence, there is a need for a system that provides global context based instrumentation to assert the quality of software applications.

OBJECTS

An object of the present disclosure is to provide a generic instrumentation system for software applications.

Another object of the present disclosure is to provide a system that assesses the quality of software applications.

Still another object of the present disclosure is to provide a system that collects quantitative information about the execution status of software applications and operating systems.

Still another object of the present disclosure is to provide a system that non-intrusively monitors and collects information pertaining to behaviour, interactions, usage and other relevant information of software applications and underlying operating system.

Still another object of the present disclosure is to manipulate and interact with the operating systems and other applications to facilitate event capturing.

Still another object of the present disclosure is to provide a non-intrusive event logging system for configuring and sensing the events occurring within the system.

Other objects and advantages of the present disclosure will be more apparent from the following description when read in conjunction with the accompanying drawings, which are not intended to limit the scope of the present disclosure.

SUMMARY

This summary is provided to introduce concepts related to providing global context based instrumentation to assert the software quality, which is further described below in the detailed description. This summary is neither intended to identify essential features of the present disclosure nor is it intended for use in determining or limiting the scope of the present disclosure.

In an embodiment, method(s) and system(s) of monitoring and logging events in a computing environment is disclosed. The method may include configuring various events associated with multiple event handlers. Further, the event handler is attached with an active process of the operating system to handle the various events. The method may further include capturing of various events by set of daemons running in the background of the operating system. To this end, the various captured events are collected and grouped under one or other group based on the similarities of the events. The method may further include filtering of collected events based on a user definable filter configuration and generating a dashboard representation of the filtered events. The dashboard representation of the filtered events reported on a suitable display device.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and modules.

DETAILED DESCRIPTION

The present disclosure relates to a system and a method of monitoring and logging events in a computing environment.

Unless specifically stated otherwise as apparent from the following discussions, it is to be appreciated that throughout the present disclosure, discussions utilizing terms such as "configuring" or "assigning" or "capturing" or "collecting" or "filtering" or "generating" or "reporting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Typically, in databases, event logging is handled by the logging subsystem which comprises a daemon and a viewer. While the log daemon handles log messages and parameter values from various processes in which the events were triggered, the log viewer provides a readable output by combining the log data with a message template. The events are generated whenever any operations are performed on the database and event parameters may be the database status, database resource status, database query, etc. Usually, the event log message comprises of the message category, symbolic message identifier, transaction identifier, events parameters, and a severity level. These logs are predominantly used to ensure consistency in the database status, thereby improving the computer system significantly. Further, the events raised by other software components at different stages of execution may significantly reduce the time it takes to diagnose various problems.

Further, the generic instrumentation is also an effective elucidation in measuring and improving the software applications hosted on the computing systems. The proposed generic instrumentation is achieved by incorporating generic event logging within the computing system. This generic event logging not only aids in trouble shooting failures of a software application but also captures detailed events including operating system events, Graphic User Interface (GUI) events and performance events. In the present disclosure, the system is capable of capturing a variety of events within an application. This in turn, allows a user of the system to avoid incorporating additional application debugging modules. In addition to this, software applications, which are not capable of event logging, may utilize the claimed system for event logging without any modification in their original applications.

Typically, event recording is specific to a software application or system. But, the present disclosure provides a universal or generic events recording capability in such a way that the events that are collected from all monitored applications are captured and recorded in a single location. This facilitates impact analysis of actions performed by a particular system on another. Further, the present disclosure allows obtaining events pertaining to any specific application by filtering and querying. A user may input a query relating to a specific instance of a software application and then receive a filtered response representing requested details relating to that specific instance.

More importantly, monitoring of various identified events of the operating system or the software application hosted on the operating system may be undertaken for many reasons. For example, the events of the operating system may be monitored to determine the effect of adding a new piece of hardware, the effect of adding a new software component, and/or to determine the amount of operating system resources being allocated to handle certain other events. Thus, a plurality of events may be logged by the present disclosure to facilitate customizing the monitoring of the operating system. A user interface may be provided to the user to select events that are to be logged by the monitor. Similarly, an Application Programming Interface (API) may be provided to process the events that are to be logged by the monitor. Since users may be interested in events that are not defined by the present disclosure, users may define events that are to be logged, and thus the present disclosure provides a mechanism for defining such events, which can then be selected via the user interface or API.

The value of monitoring and logging of various identified events of the operating system or the software application hosted on the operating system may be increased if the data produced by such monitoring is viewable in a manner that facilitates understanding the complexity of the computing system. Thus, the present disclosure includes a system and method for suitable display of monitoring of logged events data. The display of monitoring of logged data facilitates viewing items including, but not limited to, process states, thread states, process events, thread events, process switching, thread switching, events, changing states of semaphores, changing states of mutexes, entering/leaving a critical section, and the occurrence of user defined events. Since numerous items may be viewed on the suitable display device, the present disclosure provides for filtering the events, based on a user definable filter configuration, which may be viewed. For example, the user may desire to view set of events associated with starting/ending the execution of a critical operating system process, and may not desire to view other events associated with the same process. The ability to view such events facilitates diagnosing problems associated with application programs including, but not limited to, operating systems, GUIs, input devices, device drivers and/or applications. Problems whose diagnosis may be facilitated include, but are not limited to, deadlocks, pre-mature termination, resource blocking, network mismanagement, missed real time deadlines, etc. The ability to filter events to be viewed facilitates viewing a smaller and/or more focused set of data, which may improve the ability to diagnose such problems.

The present disclosure describes systems and methods for monitoring and logging events in a computing environment. According to an aspect, the monitoring and logging for selected set of events are based on collection of identified events by the daemons. Accordingly, in an embodiment, the monitoring and logging of events is implemented in the systems and the methods described herein.

According to an implementation, the present disclosure discloses an event monitoring and logging mechanism in a computing environment. The events which are associated with event handlers are configured to monitor by the user. In process, all events are time-stamped and classified according to various pre-defined categories as provided by the disclosure. Further, every event which has an associated event handler is process based on the event configuration. Furthermore, the set of event handlers are attached to every active process in the operating system to process the events received by the software applications corresponding to the process. In another implementation, every event, which is not configured for monitoring, is attached to a dummy event handler which receives the event but does not process further and does not generate any event data.

In another implementation, where event handlers are attached with the active processes of the operating system, a plurality of daemons such as a process daemon are attached with the active process of the operating system. The plurality of daemons captures the identified events. To this end, all the captured events are collected and grouped under one or more categories based on the similarity of the captured events. Further, the collected events are filtered based on a definable filter configuration. The definable filter configuration may be defined by the user directly or it may be defined by the system based on the user requirements. Further, the filter configuration may also depend on the configurational settings of the events. Further, the filtered events are translated and/or represented into an appropriate dashboard representation. Accordingly, the dashboard representation of captured events data is reported on a suitable display device.

In another implementation, the user may include anonymity to the captured event data. This may enable the masking of any reference to user profile or user data such as passwords, user names, login ids etc., in the captured event data.

In yet another implementation, the system of the present disclosure may facilitate in selecting the events from a plurality of events consisting of a system specific events, an operating system specific events, a graphical user interface (GUI) events, a network events, a file system events, a device driver events, an input device events, an application events, a browser events, and a presentation events.

In yet another implementation, the system of the present disclosure may facilitate in capturing the selected events by a plurality of daemons consisting of a GUI daemon that is configured to listen, capture, handle, and process the GUI events; a browser daemon that is configured to listen, capture, handle, and process the browser events; a file system daemon that is configured to listen, capture, handle, and process the file system events; a network daemon that is configured to listen, capture, handle, and process the network events; a device daemon that is configured to listen, capture, handle, and process the device driver events; an input daemon that is configured to listen, capture, handle, and process the keyword, mouse and other input device events; an application daemon that is configured to listen, capture, handle, and process the application events; a web-site daemon that is configured to listen, capture, handle, and process the web-site related events; a presentation daemon that is configured to listen, capture, handle, and process the presentation related events; a performance daemon that is configured to listen, capture, handle, and process the operating system performance related events, and a management daemon that is configured to listen, capture, handle, and process the operating system management related events.

In yet another implementation, the system of the present disclosure may facilitate in providing an ability to the user to configure the profile of the events that need to be captured. To this end, the system may also provide generating verbose data on user configured events.

In yet another implementation, the system of the present disclosure may facilitate event handlers to be in active state whenever the system is in use. This benefits and optimizes the utilization of the system resources. Accordingly, the event handlers may exit systematically whenever the parent processes and threads are terminated. Further, such optimization may also reflects the less computing time necessary for communicating the events and event data including the filtering and recording of the event logs.

Still yet another aspect of the present disclosure provides a computer-readable medium having embodied thereon a computer program for executing a method comprising: configuring one or more events associated with one or more event handler for monitoring; attaching the one or more event handler to one or more active processes of an operating system for processing of the one or more events; capturing the one or more events by a plurality of daemons; collecting the one or more events captured by the plurality of daemons and grouping of the captured similar events under one or more group; filtering the one or more collected events based on a definable filter configuration; generating a dashboard representation of the filtered one or more events, and reporting the dashboard representation on a suitable display mode.

These and other advantages of the present disclosure would be described in greater detail in conjunction with the following figures. While aspects of described systems and methods for monitoring and logging events of a software applications may be implemented in any number of different computing systems, environments, and/or configurations, the embodiments are described in the context of the following exemplary system(s).

Figure 1:
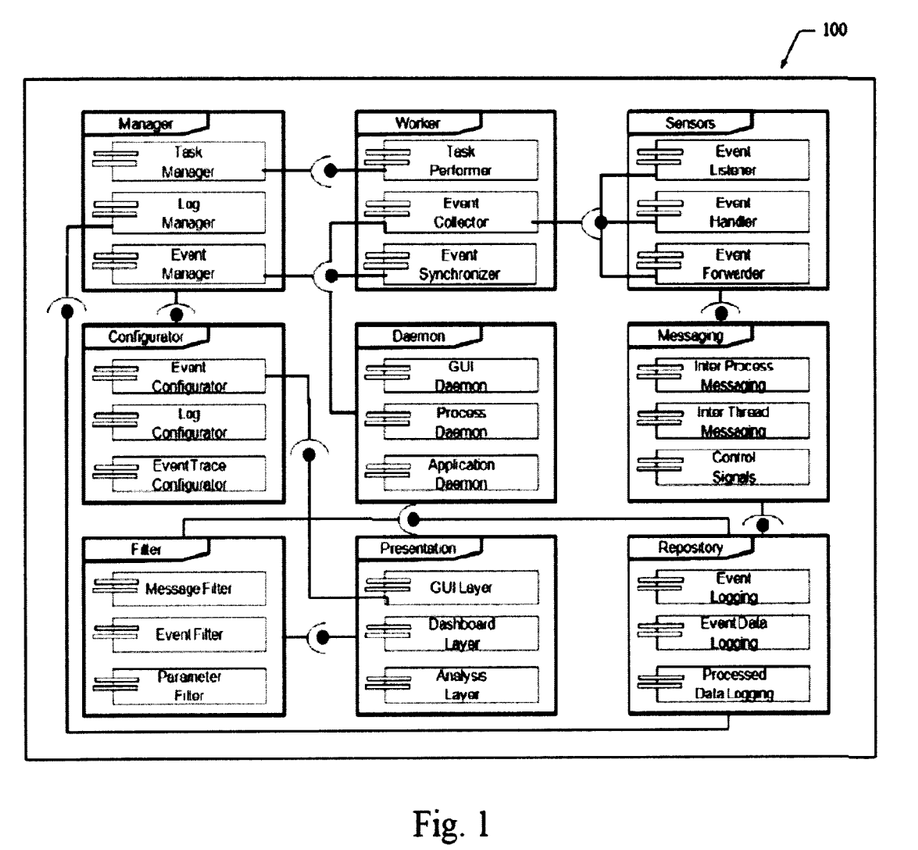
FIG. 1 illustrates the components and interfaces involved in providing generic instrumentation for software applications, according to an implementation of the present subject matter.

FIG. 1 illustrates the components and interfaces involved in an exemplary system 100 that provides generic instrumentation for software applications. The event daemon comprises GUI daemons (for capturing GUI Events), application daemons (for capturing application specific events) and process daemons (for capturing operating system resource events). Based on the processes, applications and GUI windows that are currently active, the number of active daemons varies. In additions there exists interfaces to the operating system's instrumentation framework and performance counters. Process daemons attach themselves to every process that is executed (both existing as well as newly spawned). GUI daemons attach themselves to every GUI window that is displayed. Application daemons attach themselves to certain predefined applications (for e.g. web browsers, file explorer, etc.). These daemons collectively cover the different possible events that are triggered by the operating system and any application that is hosted thereon.

As part of the generic instrumentation layer provided in FIG. 1, manager-worker composite system work together and collect the various events captured by the different daemons. The manager sub-system instructs the worker to collect events under its scope and the worker sub-system interacts with the corresponding sensor sub-system for event collection. A collection of related events are grouped together to form a sensor sub-system which listens to these events. This sub-system interacts with the manager-worker composite system to facilitate event collection. Every sensor sub-system is associated to a worker sub-system. This enables high performance in event processing. Once an event is received by the worker, it queries the operating system and obtains additional details about the event (performance details, operating system execution status, etc.). All the collected data is passed onto the recording sub-component where consolidation and streaming to file and/or database occurs. The viewer sub-system filters the streamed data based on the definable filter configuration and generates appropriate dashboard and report representation of the captured data.

Figure 2:
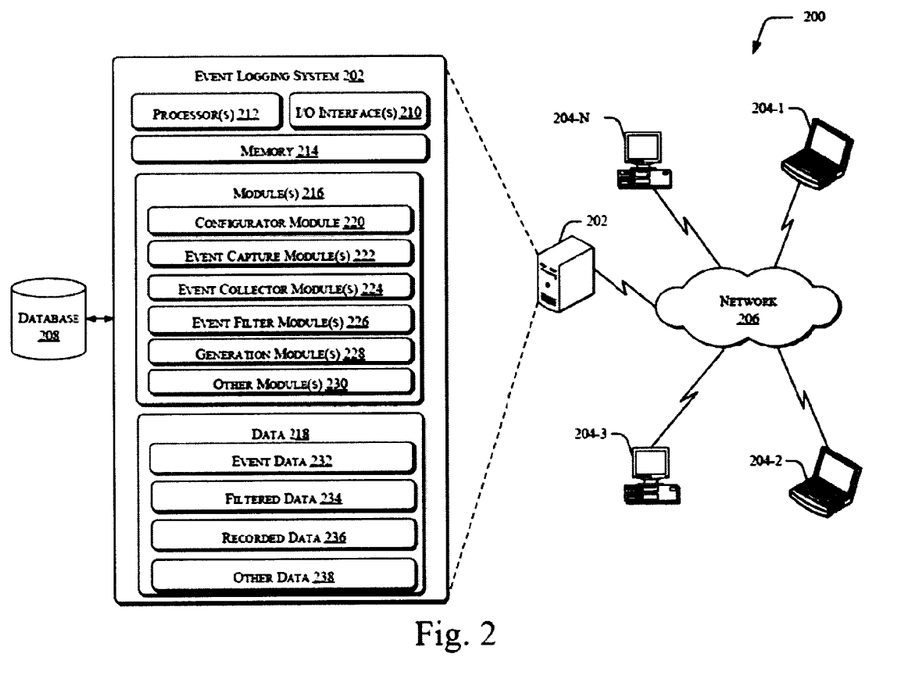
FIG. 2 illustrates a network environment implementation of an event logging system, in accordance with an embodiment of the present subject matter.

FIG. 2 illustrates a network environment 200 implementing an event logging system 202, in accordance with an embodiment of the present disclosure. In said embodiment, the network environment 200 includes the event logging system 202 configured to monitor and logging of various identified events of the operating system or the software application hosted on the operating system. The event logging system 202 includes a configurator module 220, an assigning module, an event capture module 222, an event collector module 224, an event filter module 226, and a generation module 228 for eliciting the requirement of monitoring and logging of captured events of the operating system or the software application hosted on the operating system.

In one implementation, the network environment 200 may be a company network, including thousands of office personal computers, laptops, various servers, such as blade servers, and other computing devices. Examples of a company may include an information technology (IT) company, a product manufacturing company, a human resource (HR) company, a telecommunication company, or other large conglomerates. It will also be appreciated by a person skilled in the art that the company may be any company involved in any line of business. In another implementation, the network environment 200 may be a smaller private network. In yet another implementation, the network environment 200 may be a public network, such a public cloud.

The event logging system 202 may be implemented in a variety of computing systems, such as a laptop computer, a desktop computer, a notebook, a workstation, a mainframe computer, a server, a network server, and the like. In one implementation, the event logging system 202 may be included within an existing information technology infrastructure or a database management structure. Further, it will be understood that the event logging system 202 may be connected to a plurality of user devices 204-1, 204-2, 204-3, . . . , 204-N, collectively referred to as the user devices 204 or as an individual user device 204. The user device 204 may include, but is not limited to, a desktop computer, a portable computer, a mobile phone, a handheld device, and a workstation. The user devices 204 may be used by users, such as database analysts, programmers, developers, data architects, software architects, module leaders, projects leaders, database administrator (DBA), stakeholders, and the like.

As shown in the figure, the user devices 204 are communicatively coupled to the event logging system 202 over a network 206 through one or more communication links for facilitating one or more end users to access and operate the event logging system 202. In one implementation, the network 206 may be a wireless network, a wired network, or a combination thereof. The network 206 may also be an individual network or a collection of many such individual networks, interconnected with each other and functioning as a single large network, e.g., the Internet or an intranet. The network 206 may be implemented as one of the different types of networks, such as intranet, local area network (LAN), wide area network (WAN), the internet, and such. The network 206 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 206 may include a variety of network devices, including routers, bridges, servers, computing devices, storage devices, and the like.

In an implementation, the event logging system 202 may be coupled to a database 208. Although not shown in the figure, it will be understood that the database 208 may also be connected to the network 206 or any other network in the network environment 200. In an implementation, the database 208 may include various input files and supporting files that may be used by the event logging system 202. In an implementation, the database 208 may be provided as a relational database and may store data in various formats, such as relational tables, object oriented relational tables, indexed tables. However, it will be understood that the database 208 may be provided as other types of databases, such as operational databases, analytical databases, hierarchical databases, and distributed or network databases.

The event logging system 202 further includes interface(s) 210, for example, to provide the input data in a hierarchical manner. Further, the interface(s) 210 may include a variety of software and hardware interfaces, for example, interfaces for peripheral device(s), such as a keyboard, a mouse, an external memory, and a printer. Additionally, the interface(s) 210 may enable the event logging system 202 to communicate with other devices, such as web servers and external repositories. The interface(s) 210 may also facilitate multiple communications within a wide variety of networks and protocol types, including wired networks, for example, LAN, cable, etc., and wireless networks, such as WLAN, cellular, or satellite. For the purpose, the interface(s) 210 may include one or more ports.

In an implementation, the event logging system 202 includes a processor(s) 212 coupled to a memory 214. The processor(s) 212 may be implemented as one or more microprocessors, microcomputers, microcontrollers, digital signal processors, central processing units, state machines, logic circuitries, and/or any devices that manipulate signals based on operational instructions. Among other capabilities, the processor(s) 212 may be configured to fetch and execute computer-readable instructions stored in the memory 214.

The memory 214 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the event logging system 202 includes module(s) 216 and data 218. The module(s) 216 include, for example, configurator module 220, assigning module, event capture module 222, event collector module 224, event filter module 226, generation module 228 and other module(s) 230. The other module(s) 230 may include programs or coded instructions that supplement applications or functions performed by the event logging system 202.

The data 218 may include event data 232, filtered data 234, recorded data 236, and other data 238. The other data 238, amongst other things, may serve as a repository for storing data that is processed, received, or generated as a result of the execution of one or more modules in the module(s) 216. Although the data 218 is shown internal to the event logging system 202, it may be understood that the data 218 can reside in an external repository (not shown in the figure), which may be coupled to the event logging system 202. The event logging system 202 may communicate with the external repository through the interface(s) 210 to obtain information from the data 218.

As mentioned herein, the present disclosure discloses a system and a method for monitoring and logging events in a computing environment. The present disclosure discloses the monitoring and logging for selected set of events which are based on collection of identified events by the daemons. Accordingly, the monitoring and logging of events is implemented in the systems and the methods described herein.

In an implementation, the event logging system 202 may provide information such as feedback about the activity and performance of the computing systems as well as gather information about many of the problems and/or errors that may occur during the operation of the systems. The event logging system 202 may include a configurator module 220 to configure the events associated with event handlers for monitoring purpose. The configurator module 220 may be provided to configure the system resources for which the event needs to be captured. The configurator module 220 may also be provided to configure the events that need to be listened. The configurator module 220 may also be provided to configure the events details that need to be recorded. Further, the configurator module 220 may also be provided to configure the supplemental event details to be recorded.

According to the present implementation, the event logging system 202 may include the assigning module to attach the event handlers to every active process of the operating system to process the events received by the software application corresponding to the process. The assigning module may further passed theses selected events onto the software application for further processing. Further, the assigning module may also attach a set of events, which are not configured for monitoring by the configurator module 220, to a dummy event handler. In this respect, the dummy event handler may receive such set of events but does not process further and does not generate any event data.

According to the present implementation, the event logging system 202 may also include the event capture module 222 to capture the identified events by different daemons. The event daemon may include a GUI daemon which is configured to capture the GUI related events. The event daemon may also include an application daemon which is configured to capture the application specific events. The event daemon may also include a process daemon which is configured to capture the operating system resource events. Further, it may also be possible, based on the processes, applications and GUI windows that are currently active, the number of active daemons varies. In additions, the process daemons may attach themselves to every process that is executed to both existing as well as newly spawned. Similarly, the GUI daemons may attach themselves to every GUI window that is displayed and Application daemons may attach themselves to certain predefined applications such as web browsers, file explorer. In summary, these daemons collectively cover the different possible events that are triggered by the operating system and any application that is hosted on the operating system.

According to the present implementation, the event logging system 202 may also include the event collector module 224 to collect the events captured by the different daemons and arrange the similar captured events under one or more groups. Further, the event logging system 202 include the event filter module 226 to filter all the collected events based on a definable filter configuration.

According to the present implementation, the event logging system 202 may also include the generation module 228 to generate a dashboard representation of the filtered event data. Subsequently, the dashboard representation of captured event data is reported to the user by suitably displaying on a display device.

In another implementation, the configurator module 220 may configure to assign event-id and time-stamp to all events of the computing environment. Further, the events may also be classified according to pre-defined categories. Such classification may help in consolidation and synchronization of the captured event logs. This may also help in resolving the conflict, if any, by ordering the captured events based on the time-stamp, classification and event id.

In another implementation, the assigning module may configure to attach the event handlers to the active process of the operating system to process the events received by the software application corresponding to the process. The assigning module may also be configure to attach, for all extensible applications such as browsers, pluggable event handlers to every instance of the application so as to process the events received by the applications.

In another implementation, the assigning module may configure to manage event handlers in such a way that it may responds to the directives of the user such as worker in a Manager/Workers based organization.

Figure 3:
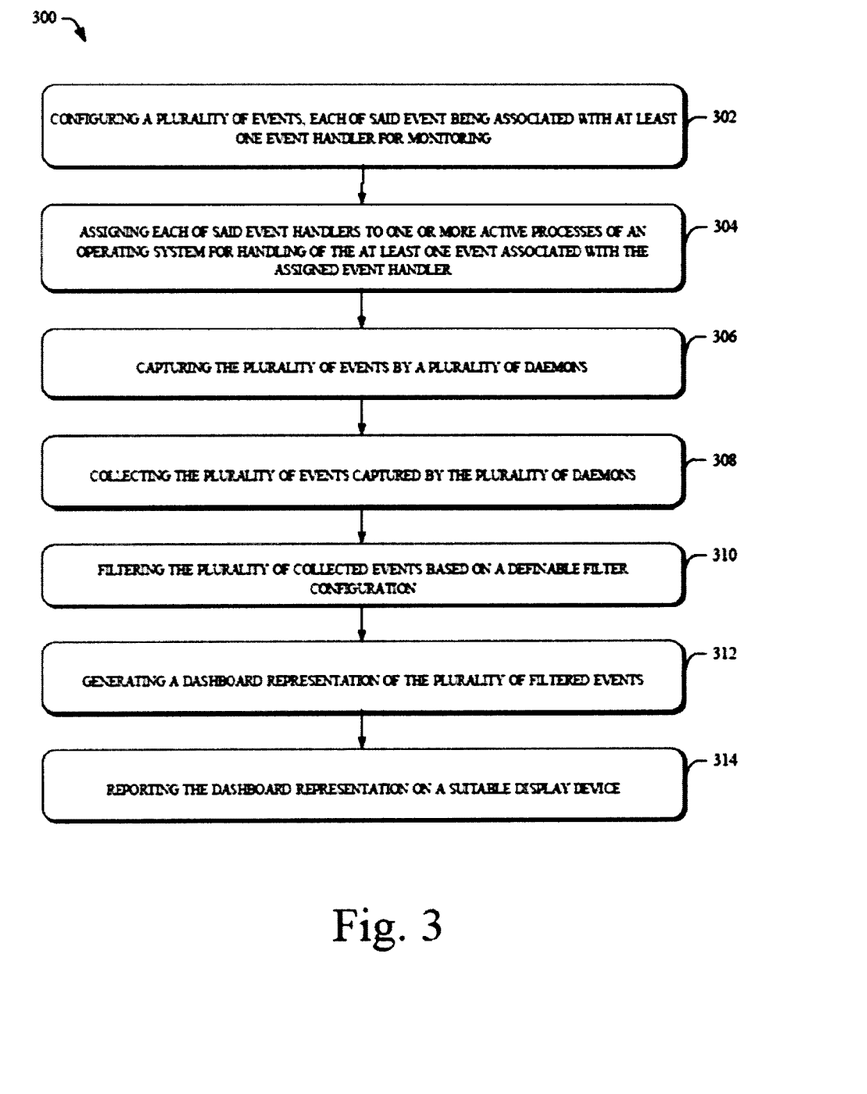
FIG. 3 shows a flowchart illustrating a method of monitoring and logging events in a computing environment, in accordance with an embodiment of the present subject matter.
Figure 4:
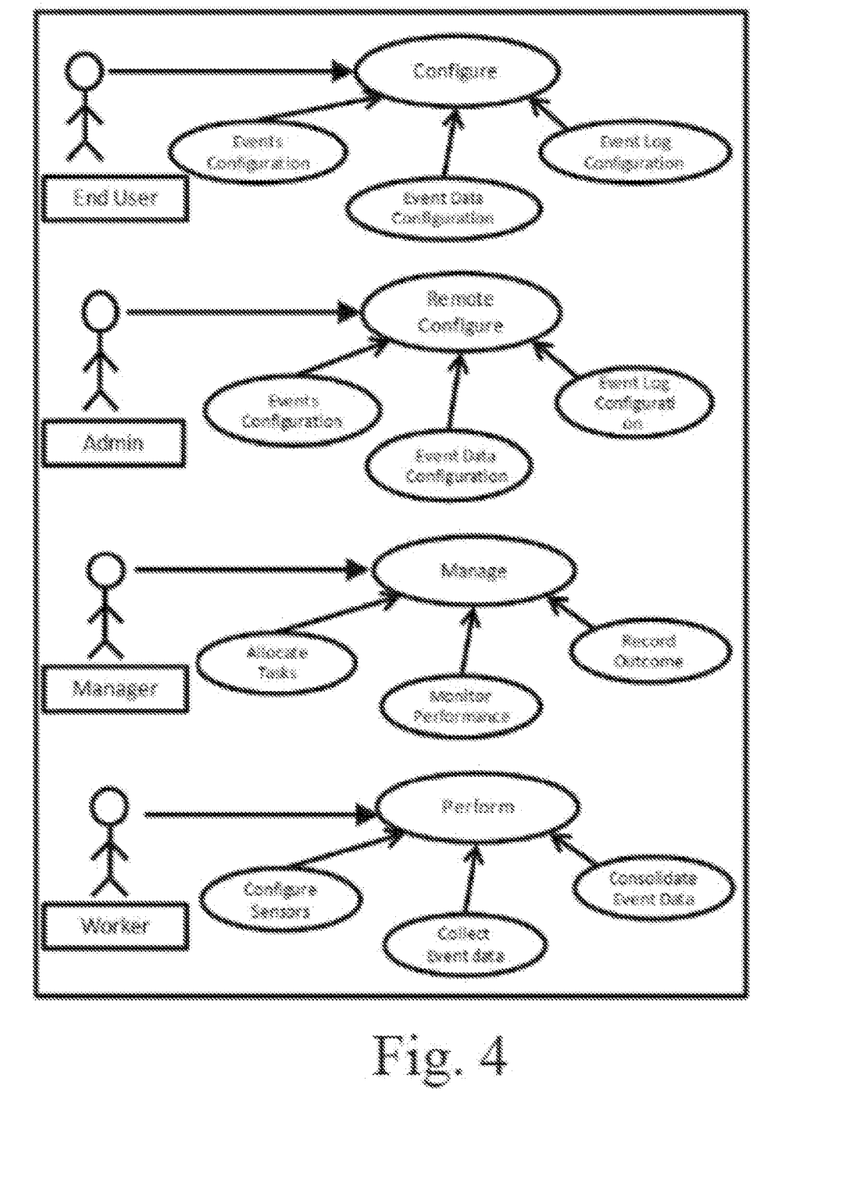
FIG. 4 illustrates a representation of the usage process that facilitates the functionalities provided by various components to be utilized to perform tasks in the real world, in accordance with an embodiment of the present subject matter.

FIG. 3 illustrates a computer implemented method 300 for monitoring and logging of various identified events of the operating system or the software application hosted on the operating system. The method 300 may be described in the general context of computer executable instructions. Generally, computer executable instructions can include routines, programs, objects, components, data structures, procedures, modules, functions that perform particular functions or implement particular abstract data types. The method 300 may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternative methods. Additionally, individual blocks may be deleted from the method 300 without departing from the spirit and scope of the disclosure described herein. Furthermore, the method 300 can be implemented in any suitable hardware, software, firmware, or combination thereof.

At block 302, the method 300 may include configuring the events associated with one or more event handlers for monitoring. The configuring of the events may be indicative of assigning time-stamp and classification based on the one or more pre-defined categories. In an implementation, the configurator module 220 may be configured to associate the events with events handlers. It will be evident to a person skilled in the art that the configurator module 220 may have various outside configuration settings provided to support any kind of configurational requirement of the system.

At block 304, the method 300 may include assigning the event handlers to the active processes of the operating system for processing of the events received by the software applications corresponding to the process. Further, the events may be passed onto the software applications for further processing. In an implementation, the assigning module may be configured to attach the event handlers to active processed of the operating system for processing of the events received by the applications corresponding to the process.

At block 306, the method 300 may include capturing the selected events by different daemons. This may be indicative of capturing events in the end users computing device. In an implementation, the event capture module 222 may be configured to capture the events by the plurality of daemons. It will be evident to a person skilled in the art that the event capture module 222 may use various daemons consisting of a GUI daemon that is configured to listen, capture, handle, and process the GUI events; a browser daemon that is configured to listen, capture, handle, and process the browser events; a file system daemon that is configured to listen, capture, handle, and process the file system events; a network daemon that is configured to listen, capture, handle, and process the network events; a device daemon that is configured to listen, capture, handle, and process the device driver events; an input daemon that is configured to listen, capture, handle, and process the keyword, mouse and other input device events; an application daemon that is configured to listen, capture, handle, and process the application events; a website daemon that is configured to listen, capture, handle, and process the web-site related events; a presentation daemon that is configured to listen, capture, handle, and process the presentation related events; a performance daemon that is configured to listen, capture, handle, and process the operating system performance related events, and a management daemon that is configured to listen, capture, handle, and process the operating system management related events.

At block 308, the method 300 may include collecting the events captured by the different daemons and grouping of the captured similar events under one or more groups. In an implementation, the event collector module 224 may be configured to collect the captured events and group the captured similar events in one or more groups.

At block 310, the method 300 may include filtering the collected events based on a definable filter configuration. In an implementation, the event filter module 226 may be configured to filter the collected events based on the definable filter configuration.

At block 312, the method 300 may include generating a dashboard representation of the filtered events. In an implementation, the generation module 228 may be configured to generate the dashboard representation of the filtered events data.

Further, at block 314, the method 300 may include reporting the dashboard representation of the filtered events on a suitable display device.

Although implementations for determining consumption of resources have been described in language specific to structural features and/or method, it is to be understood that the appended claims are not necessarily limited to the specific features or method described. Rather, the specific features and method are disclosed as exemplary implementations for determining consumption of resources.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A computer-implemented method for monitoring and logging events in a computing environment having a processing unit, the method comprising:
configuring a plurality of events, each of said event being associated with at least one event handler for monitoring, wherein the plurality of events, which are not configured for monitoring, are attached to a dummy event handler;
assigning each of said event handlers to one or more active processes of an operating system for handling of the at least one event associated with the assigned event handler;
capturing the plurality of events by a plurality of daemons;
collecting the plurality of events captured by the plurality of daemons;
filtering the plurality of collected events based on a definable filter configuration;
generating a dashboard representation of the plurality of filtered events; and
reporting the dashboard representation on a suitable display device.

2. The method as claimed in claim 1, wherein the plurality of events is time-stamped and classified according to one or more pre-defined categories.

3. The method as claimed in claim 1, wherein the plurality of similar captured events is grouped in one or more groups.

4. The method as claimed in claim 1, wherein the at least one event handler process the plurality of events based on the one or more events configuration.

5. The method as claimed in claim 4, wherein the at least one event handler handle more than one event.

6. The method as claimed in claim 1, wherein the plurality of events include system specific events, operating system specific events, GUI events, network events, file system events, input device events, application events, browser events, presentation events and device driver events.

7. The method as claimed in claim 1, wherein the plurality of daemons includes:
a GUI daemon to listen, capture, handle, and process the GUI events;
a browser daemon to listen, capture, handle, and process the browser events;
a file system daemon to listen, capture, handle, and process the file system events;
a network daemon to listen, capture, handle, and process the network events;
a device daemon to listen, capture, handle, and process the device driver events;
an input daemon to listen, capture, handle, and process the keyword, mouse and other input device events;
an application daemon to listen, capture, handle, and process the application events;
a website daemon to listen, capture, handle, and process the web-site related events;
a presentation daemon to listen, capture, handle, and process the presentation related events;
a performance daemon to listen, capture, handle, and process the operating system performance related event; and
a management daemon to listen, capture, handle, and process the operating system management related events.

8. The method as claimed in claim 1, wherein a reference to any user and user profile data are masked in a captured event data.

9. An event logging system for monitoring and logging events in a computing environment comprising:
a processor; and
a memory coupled to the processor comprises:
a configurator module configured to configure a plurality of events, each of said event being associated with at least one event handler for monitoring, wherein the configurator module is further configured to attach the plurality of events, which are not configured for monitoring, to a dummy event handler;
an assigning module configured to assign each of said event handler to one or more active processes of an operating system for handling of the at least one event associated with the assigned event handler;
an event capture module configured to capture the plurality of events by a plurality of daemons;
an event collector module configured to collect the plurality of events captured by the plurality of daemons;
an event filter module configured to filter the plurality of collected events based on a definable filter configuration;
a generation module configured to generate a dashboard representation of the plurality of filtered events; and
a display device configured to display the dashboard representation of the plurality of filtered events.

10. The event logging system as claimed in claim 9, wherein the assigning module is further configured to time-stamp the plurality of events and classify the plurality of events according to one or more pre-defined categories.

11. The event logging system as claimed in claim 9, wherein the at least one event handler is configured to process the plurality of events based on the one or more event configuration.

12. The event logging system as claimed in claim 11, wherein the at least one event handler is configured to handle more than one event.

13. The event logging system as claimed in claim 9, wherein the configurator module is configured to group the plurality of similar captured events into one or more groups.

14. The event logging system as claimed in claim 9, wherein the plurality of events include system specific events, operating system specific events, GUI events, network events, file system events, input device events, application events, browser events, presentation events and device driver events.

15. The event logging system as claimed in claim 9, wherein the plurality of daemons includes at least one daemon selected from the group consisting of:
a GUI daemon to listen, capture, handle, and process the GUI events;
a browser daemon to listen, capture, handle, and process the browser events;
a file system daemon to listen, capture, handle, and process the file system events;
a network daemon to listen, capture, handle, and process the network events;
a device daemon to listen, capture, handle, and process the device driver events;
an input daemon to listen, capture, handle, and process the keyword, mouse and other input device events;
an application daemon to listen, capture, handle, and process the application events;
a website daemon to listen, capture, handle, and process the web-site related events;

a presentation daemon to listen, capture, handle, and process the presentation related events;

a performance daemon to listen, capture, handle, and process the operating system performance related events; and a management daemon to listen, capture, handle, and process the operating system management related events.

16. The event logging system as claimed in claim 9, wherein the event filter module is further configured to mask a reference to any user and user profile data in a captured events data.

17. A non-transitory computer-readable medium having embodied thereon a computer program for executing a method for monitoring and logging events in a computing environment, the method comprising:

configuring a plurality of events, each of said event being associated with at least one event handler for monitoring, wherein the plurality of events, which are not configured for monitoring, are attached to a dummy event handler;

assigning each of said one event handler to one or more active processes of an operating system for handling of the at least one event associated with the assigned event handler;

capturing the plurality of events by a plurality of daemons;

collecting the plurality of events captured by the plurality of daemons;

filtering the plurality of collected events based on a definable filter configuration;

generating a dashboard representation of the plurality of filtered events; and reporting the dashboard representation on a suitable display device.

* * * * *